United States Patent [19]

Kai

[11] Patent Number: 4,697,070
[45] Date of Patent: Sep. 29, 1987

[54] CONTACT LENS STERILIZATION DEVICE

[75] Inventor: Isao Kai, Kameoka, Japan

[73] Assignee: Omron Tateisi Electronics Co., Kyoto, Japan

[21] Appl. No.: 844,364

[22] Filed: Mar. 26, 1986

[30] Foreign Application Priority Data

Apr. 22, 1985 [JP] Japan .................................. 60-87054
Apr. 22, 1985 [JP] Japan ............................ 60-60866[U]
Apr. 22, 1985 [JP] Japan ............................ 60-60867[U]

[51] Int. Cl.$^4$ ............................................. H05B 3/10
[52] U.S. Cl. ................................... 219/521; 219/386; 422/300; 439/131
[58] Field of Search ............... 219/385, 386, 521, 387, 219/214, 430, 433, 435, 439, 462, 438; 422/105, 109, 164, 292, 300, 302, 307; 339/34

[56] References Cited

U.S. PATENT DOCUMENTS

| | | | |
|---|---|---|---|
| 3,926,494 | 12/1975 | Maillaro | 339/34 |
| 4,101,757 | 7/1978 | VanDyck | 339/34 |
| 4,105,968 | 8/1978 | Mobley | 339/34 |
| 4,158,126 | 6/1979 | Seitz | 219/386 |
| 4,165,359 | 8/1979 | Thomas | 219/433 |
| 4,242,304 | 12/1980 | Ryder | 422/300 |
| 4,242,572 | 12/1980 | Thomas | 219/521 |
| 4,472,623 | 9/1984 | Futter | 219/430 |
| 4,529,868 | 7/1985 | Bowen | 219/521 |

FOREIGN PATENT DOCUMENTS

2416492 10/1979 France .................. 219/201

*Primary Examiner*—E. A. Goldberg
*Assistant Examiner*—Teresa J. Walberg
*Attorney, Agent, or Firm*—Wegner & Bretschneider

[57] ABSTRACT

This contact lens sterilization device includes: a main body casing formed as an integral structure, with a main cavity and a power plug storage chamber being defined in the main body casing and being substantially sealed off from communication with one another, the main cavity further being substantially sealed off from communication with the outside, a contact lens sterilization chamber being at least partly defined by a portion of the main body casing which also defines one part of the main cavity; a control system accomodated in the main cavity of the main body casing; a heating system, likewise accomodated in the main cavity of the main body casing, and selectively actuated by the control system to produce heat and to apply the heat to the portion of the main body which partly defines the contact lens sterilization chamber; a power plug assembly, received in the power plug storage chamber, and comprising a pair of terminal portions which according to movement of the power plug assembly within the power plug storage chamber selectively either can be projected to the outside from the power plug storage chamber or can be withdrawn to the inside of the power plug storage chamber; and: a pair of fixed contacts fitted so as electrically to connect portions of the control system to the terminal portions of the power plug assembly. Thereby, advantages of durability and compactness are made available, and the ingress of moisture and dirt is positively prevented.

9 Claims, 7 Drawing Figures

CONTACT LENS STERILIZATION DEVICE

BACKGROUND OF THE INVENTION

The present invention relates to the field of devices for the sterilization of contact lenses, and more specifically relates to the field of modern contact lens sterilization devices which incorporate within them means for providing heat for boiling and sterilization of such contact lenses.

Nowadays the use of contact lenses for eyesight enhancement and correction is becoming more and more popular, in line with increased demands for facial attractiveness and convenience of use. Especially in the case of so called soft type contact lenses, boiling and sterilization of contact lenses is very important from the point of view of ensuring comfortable use of said contact lenses, and from the point of view of preventing eye infections and eye irritation syndromes such as conjunctivitis and the like. Therefore, various types of contact lens sterilization device have been developed.

In a typical such contact lens sterilization device, there are included a lens storage casing formed with two lens storage compartments for storing the two contact lenses of a pair as each immersed in water or sterilization liquid, and a main body casing, formed separately from said leans storage casing, for accommodating a circuit unit and a heating means which is provided with energy for heating by said circuit unit. And the lens storage casing is mounted to the main body casing, so that the lens storage compartments should be supplied with heat generated by the heating unit under the control of said circuit unit, so as to heat and boil the water or sterilization liquid and the contact lenses contained in said compartments, thereby to sterilize said contact lenses. It is typical to form said lens storage casing separately from said main body casing, because there is a tendency for the water or sterilization liquid to overflow when it is being poured by the user into said contact lens sterilization compartments, and, since the main casing accommodates the circuit unit, said main casing is absolutely required to be proof against the intrusion of dirt or water or other moisture into it. In more detail, typically the heating unit comprises a heat emission plate to which a heating element is attached for heating it, and the heat produced by said heating element is conducted by way of the main body casing and the lens storage casing to the lens storage compartments and to the water or sterilization liquid and the contact lenses contained in said compartments, thereby to sterilize said contact lenses. This is typically done by such a heat emission plate construction as outlined above being typically held to the casing so that its one surface is wholly in contact with said casing, and the parts of said casing in the general vicinities of the lens storage compartments are heated up so as thereby to heat up said lens storage compartments.

However, since two separate casings are required in such a prior art contact lens sterilization device, the device has an undesirable tendency to become large in size and heavy. Nowadays, it it becoming very common for such a contact lens sterilization device to be carried by the user on his or her person, during trips or to work or the like, and according to such peripatetic use such bulkiness and such heaviness are great drawbacks.

Further, such a heat emission plate construction as outlined above is subject to the problems that, since the heat produced thereby is diffused via the casing to the lens storage compartments, much of the heat is conducted to irrelevant parts of the contact lens sterilization device and is wasted, thus entailing the disadvantages of low heating efficiency and large power consumption. Further, since various parts of the surface of the casing become unduly hot, a substantial risk is engendered of the user being burnt, scorched or scalded by touching said casing surface parts. In particular, although in a conventional type of contact lens sterilization device in which the lens storage casing comprising the contact lens storage compartments and the main body casing containing the heating device are provided as separate bodies there may be no substantial problem of the whole of the lens storage casing becoming unduly hot, in the case that these lens storage casing and main body casing are formed as one integral casing there is a great danger that the whole of the outer surface of the casing may become unduly hot. And, in the prior art, there has been no means provided of protecting the user against such heating up of the casing surface. Typically, if the lens storage chambers for sterilization of the contact lenses become heated up to temperatures of for example greater than 80° C., then although parts of the casing of the contact lens sterilization device may become unduly hot the user is not made aware of this fact, which can cause severe problems, and the risk of burning, scorching, or scalding of said user is increased. And these problems are accentuated as the size of the contact lens sterilization device is reduced.

SUMMARY OF THE INVENTION

Therefore, it may be conceived of to develop a contact lens sterilization device in which the lens casing is integrally formed with the main body casing which has a completely sealed structure, in order to provide high compactness. In such a contact lens sterilization device, if the male AC power plug thereof is mounted on the end of a lead wire extending from its main body, this construction is bulky and troublesome for the user. Accordingly, it is convenient and appropriate for the plug terminals of the male power plug to be protruded from the main body casing, ready to be inserted into a normal female type of AC power outlet, so as to supply usual household AC power to the circuit unit in order to cause heat to be generated by the heating unit for heating and boiling the water or sterilization liquid and the contact lenses contained in the storage compartments of the lens casing.

However, such a construction has the following problems and drawbacks. In such an integrally formed contact lens sterilization device, since the male power plug terminals are fixed to the main body casing in their protruding state, in the first place they could be hazardous and could prick into a user, and in the second place there is a likelihood that, after repeated application of bending forces caused by the repeated insertion and withdrawal of said male power plug terminals into and out of mating female AC outlets and also caused by possible wiggling to and fro of said plug terminals in said AC outlets, relatively small gaps may tend to open up between said male power plug terminals and said main body casing, through which small gaps not only dirt but also external fluids such as water or sterilization fluid would inevitably ooze into the interior of the contact lens sterilization device, thereby typically causing failure of the circuit unit thereof and possibly even more serious consequences such as short circuiting and fuse blowing. Furthermore, a cap or protective sheath would be required to be provided for covering over the male power plug terminals, and this would increase the number of parts of the contact lens sterilization device, as well as being easily lost or mislaid.

An alternative possible construction to having male plug terminals fixedly erected to and protruding from the main body casing would be provide a pronged male power plug as slidably fitted within a cavity of the main body casing, in such a manner that the male terminals of said power plug can be selectably slidably protruded from said main body casing for selectably desirably coupling to a female AC outlet, but it is required in such a case to provide spring contact pieces for making contact between said slidable male terminals and the circuit unit, because said male terminals slide to and fro, and the provision of such spring contact pieces causes the problem of providing a properly sealed structure to be accentuated, since such spring contact pieces are typically soldered to the main circuit board and hence their sliding contact with said male terminals causes a blatant source of leakage.

Accordingly, it is the primary object of the present invention to provide a contact lens sterilization device, which avoids the above described problems.

It is a further object of the present invention to provide such a contact lens sterilization device, which does not have any extended lead wire with a male AC power plug appended at the end thereof.

It is a further object of the present invention to provide such a contact lens sterilization device, which is guaranteed of good sealing characteristic.

It is a further object of the present invention to provide such a contact lens sterilization device, which is proof against the inward oozing of dirt or water or moisture.

It is a yet further object of the present invention to provide such a contact lens sterilization device, which maintains its good leakproof condition even when its male plug terminals are abused as by repeated insertion into or wiggling within female AC plugs.

It is a yet further object of the present invention to provide such a contact lens sterilization device, which is not subject to any problem of opening up of gaps which can cause leaks between its male plug terminals and its main casing.

It is a yet further object of the present invention to provide such a contact lens sterilization device, which does not require any provision of spring contact pieces for contacting movable male plug terminals thereof to others of its portions.

It is a yet further object of the present invention to provide such a contact lens sterilizaion device, which does not require any provision of any protective sheath for its male plug terminals.

It is a yet further object of the present invention to provide such a contact lens sterilization device, which is not prone to loss or mislaying of any such protective sheath for its male plug terminals.

It is a yet further object of the present invention to provide such a contact lens sterilization device, the surface parts of which do not suffer very great heating up by the action of the heating device included in them.

It is a yet further object of the present invention to provide such a contact lens sterilization device, with the use of which no substantial risk is engendered of the user being burnt, scorched or scalded by touching surface parts of its casing.

It is a yet further object of the present invention to provide such a contact lens sterilization device, which is compact.

It is a yet further object of the present invention to provide such a contact lens sterilization device, which is not at all hazardous.

It is a yet further object of the present invention to provide such a contact lens sterilization device, in the use of which the user is warned if parts of its outer casing become unduly hot.

It is a yet further object of the present invention to provide such a contact lens sterilization device, which is durable.

It is a yet further object of the present invention to provide such a contact lens sterilization device, which is easily portable.

It is a yet further object of the present invention to provide such a contact lens sterilization device, which is cheap.

It is a yet further object of the present invention to provide such a contact lens sterilization device, which is easy to assemble.

It is a yet further object of the present invention to provide such a contact lens sterilization device, which is of simple structure.

According to a first aspect of the present invention, these and other objects are accomplished by a contact lens sterilization device, comprising: a main body casing formed as an integral structure, with a main cavity and a power plug storage chamber being defined in said main body casing and being substantially sealed off from communication with one another, said main cavity further being substantially sealed off from communication with the outside, a contact lens sterilization chamber being as least partly defined by a portion of said main body casing which also defines one part of said main cavity; a control system accomodated in said main cavity of said main body casing; a heating system, likewise accomodated in said main cavity of said main body casing, and selectively actuated by said control system to produce heat and to apply said heat to said portion of said main body which partly defines said contact lens sterilization chamber; a power plug asssembly, received in said power plug storage chamber, and comprising a pair of terminal portions which according to movement of said power plug assembly within said power plug storage chamber selectively either can be projected to the outside from said power plug storage chamber or can be withdrawn to the inside of said power plug storage chamber; and: a pair of fixed contacts fitted so as electrically to connect portions of said control system to said terminal portions of said power plug assembly.

According to the present invention, because the main cavity in the body casing is substantially sealed, the ingress of water or moisture or other contaminants such as dirt to sully and interfere with the control system and the heating system is effectively prevented. When it is desired to supply electrical power to the contact lens sterilization device, simply the terminal portions of the power plug assembly are projected out of the power plug storage chamber by movement of said power plug assembly in said storage chamber, and are plugged into a female AC power electrical socket. Then, via said terminal portions, AC power is conveyed to said fixed contacts, which lead said AC power to said control system to actuate it. Then said control system selectively supplies power to said heating unit, to cause it to generate heat and to supply said heat to said portion of said main body which partly defines said contact lens sterilization chamber. Thereby, said contact lens sterilization chamber is heated up, and a contact lens and sterilization fluid such as water or the like stored therein are heated up and boiled and sterilized. According to the present invention as defined above, therefore, there is provided a contact lens sterilization device which does not have any extended lead wire with a male AC power plug appended at the end thereof, and which is guaranteed of good sealing characteristic, being proof against the inward oozing of dirt or water or moisture. Further, even when the male plug terminals are abused as by repeated insertion into or wiggling within female AC plugs, there is no risk of any problem of opening up of gaps which can cause leaks, because the plug terminals are not directly mounted to the main casing but rather to the movable power plug assembly. Further, this contact lens sterilization device does not require any provision of any protective sheath for its male plug terminals, because said main plug terminals can be retracted to within the power plug storage chamber when the user so desires. Accordingly the problem of possible loss or mislaying of any such protective sheath is avoided. This contact lens sterilization device thus is compact and not at all hazardous, as well as being durable and cheap.

According to a second aspect of the present invention, these and other objects are accomplished by a contact lens sterilization device, comprising: a main body casing formed as an integral structure, with a main cavity and a power plug storage chamber being defined in said main body casing and being substantially sealed off from communication with one another, said main cavity further being substantially sealed off from communication with the outside, a contact lens sterilization chamber being at least partly defined by a portion of said main body casing which also defines one part of said main cavity; a control system accomodated in said main cavity of said main body casing; a heating system, likewise accomodated in said main cavity of said main body casing, and selectively actuated by said control system to produce heat and to apply said heat to said portion of said main body which partly defines said contact lens sterilization chamber; a pair of fixed contacts fitted from said main cavity of said main body casing to said plug storage chamber and electrically connected in said main cavity to portions of said control system; and: a power plug assembly, received in said power plug storage chamber, comrising: a main plug body member; a pair of terminal portions, mounted to said main plug body member, which according to movement of said power plug assembly within said power plug storage chamber selectively either can be projected to the outside from said power plug storage chamber or can be withdrawn to the inside of said power plug storage chamber; a knob an actuation portion or which protrudes to the outside of said power plug storage chamber; and: a spring which biases said knob and said main plug body member apart from one another so as to bias said actuation portion of said knob towards the outside and so as to bias said terminal portions each to contact one of said pair of fixed contacts.

According to this second aspect of the present invention as defined above, because the fixed contact pieces are not required to be spring contact pieces, good sealing between said fixed contact pieces and the portion of the main casing through which they are passed is made possible, and furthermore compactness is enhanced, thus increasing good portability. Also, cost is reduced and the contact lens sterilization device is made easier to assemble.

According to a third aspect of the present invention, these and other objects are accomplished by a contact lens sterilization device, comprising: a main body casing formed as an integral structure, with a main cavity and a power plug storage chamber being defined in said main body casing and being substantially sealed off from communication with one another by an insulating wall member, said main cavity further being substantially sealed off from communication with the outside, a contact lens sterilization chamber being at least partly defined by a portion of said main body casing which also defines one part of said main cavity; a control system, comprising at least one electronic component and a printed circuit board, accomodated in said main cavity of said main body casing; heating system, likewise accomodated in said main cavity of said main body casing, and selectively actuated by said control system to produce heat and to apply said heat to said portion of said main body which partly defines said contact lens sterilization chamber; a pair of fixed contacts fitted from said main cavity of said main body casing through said insulating wall member to said plug storage chamber and electrically connected in said main cavity to portions of said printed circuit board; and: a power plug assembly, received in said power plug storage chamber, comprising: a main plug body member; a pair of terminal portions, mounted to said main plug body member, which according to movement of said power plug assembly within said power plug storage chamber selectively either can be projected to the outside from said power plug storage chamber or can be withdrawn to the inside of said power plug storage chamber; a knob an actuation portion of which protrudes to the outside of said power plug storage chamber; and: a spring which biases said knob and said main plug body member apart from one another so as to bias said actuation portion of said knob towards the outside and so as to bias said terminal portions each to contact one of said pair of fixed contacts.

According to this third aspect of the present invention as defined above, since the power plug storage chamber is separated from the main cavity by an insulator, and since the internal ends of the fixed contacts are directly connected to portions of the printed circuit board, as opposed to conventional devices utilizing spring contact pieces the circuit unit and the plug storage chamber can be completely separated. And, since the fixed contact pieces can be directly connected to the printed circuit board in the same was as spring contact piecese, the main body casing can be built as a completely sealed structure.

According to a fourth aspect of the present invention, these and other objects are accomplished by a contact lens sterilization device, comprising: a main body casing formed as an integral structure and defining a main cavity, a contact lens sterilization chamber being at least partly defined by a portion of said main body casing; a control system accomodated in said main cavity of said main body casing; a heating system, likewise accomodated in said main cavity of said main body casing, comprising a heat emission plate which is held against said portion of said main body which partly defines said contact lens sterilization chamber, and a heat production means which is selectively actuated by said control system to produce heat and to apply said heat to said heat emission plate.

According to this fourth aspect of the present invention as defined above, the heat from the heat emission plate is preferentially conducted to the portion of said main body which partly defines said contact lens sterilization chamber, and thereby the heating up of the outer surface of the main body casing is militated against, and the efficiency of the heating is much increased. In other words, there is a much reduced chance of said outer surface of said main body casing getting so hot as to run a risk of burning or scorching the user; and furthermore energy conservation is desirably promoted.

And, according to a fifth and final aspect of the present invention, these and other objects are accomplished by a contact lens sterilization device, comprising: a main body casing formed as an integral structure and defining a main cavity, a contact lens sterilization chamber being at least partly defined by a portion of said main body casing; a heating system, accomodated in said main cavity of said main body casing, which when selectively supplied with actuating electrical energy produces heat and apply said heat to said contact lens sterilization chamber; a control system, also accomodated in said main cavity of said main body casing, which when supplied with actuating electrical energy is active for a certain time interval to supply actuating electrical energy to said heating system, and then ceases its activity; and: a means, mounted on the outer surface of said main body casing, for displaying an indication representative of the temperature thereof.

According to this fifth and final aspect of the present invention as defined above, it is clearly displayed that the surface temperature has dropped after the completion of the sterilization process. Accordingly, with the use of this contact lens sterilization device, no substantial risk is engendered of the user being burnt, scorched or scaled by touching surface parts of its casing, and the safety factor is greatly enhanced. And the dropping of the temperature indication may serve as a signal for disconnecting this contact lens sterilization device from its power source, which is quite convenient.

BRIEF DESCRIPTION OF THE DRAWINGS

The present invention will now be shown and described with regard to the preferred embodiment thereof, and with reference to the illustrative drawings, which however should not be considered as limitative of the present invention in any way, since the scope of the present invention is to be considered as being delimited solely by the accompanying claims, rather than by any particular features of the disclosed embodiment or of the drawings. In these drawings:

FIG. 1a is a figure showing the preferred embodiment of the contact lens sterilization device of the present invention in exploded perspective view, while FIG. 1b shows in perspective view the upper side of a heat emission plate the lower side only of which is visible in FIG. 1a;

FIG. 4 is a partial perspective sectional view of the casing assembly of said preferred embodiment by itself as seen from below, and taken in a sectional plane perpendicular to and bisecting its major axis;

FIG. 5 is a perspective partial sectional view of said preferred embodiment contact lens sterilization device in its assembled state, likewise as seen from below, and taken in a sectional plane the same as that of FIG. 4; and FIG. 6 is a perspective view of said preferred embodiment contact lens sterilization device in its assembled form, as seen from the opposite side thereof to that shown in FIG. 2.

DESCRIPTION OF THE PREFERRED EMBODIMENTS

Figure 1A:
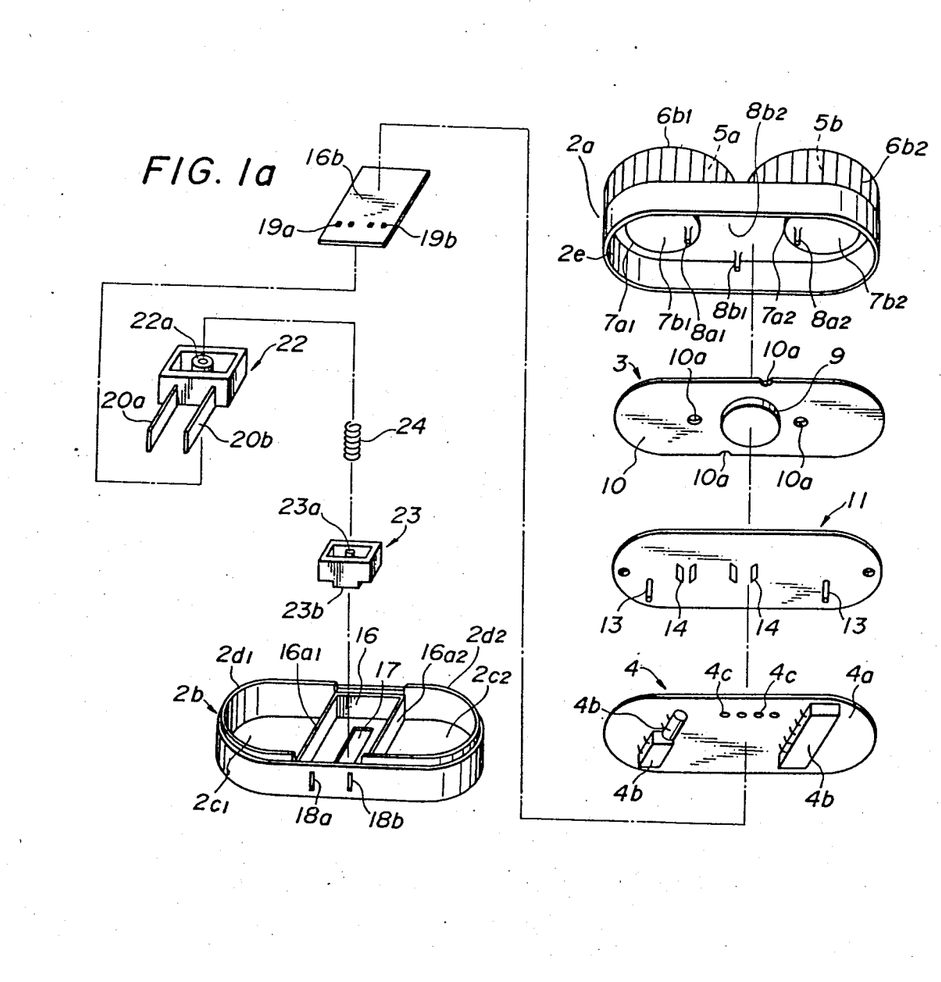
Figure 2:
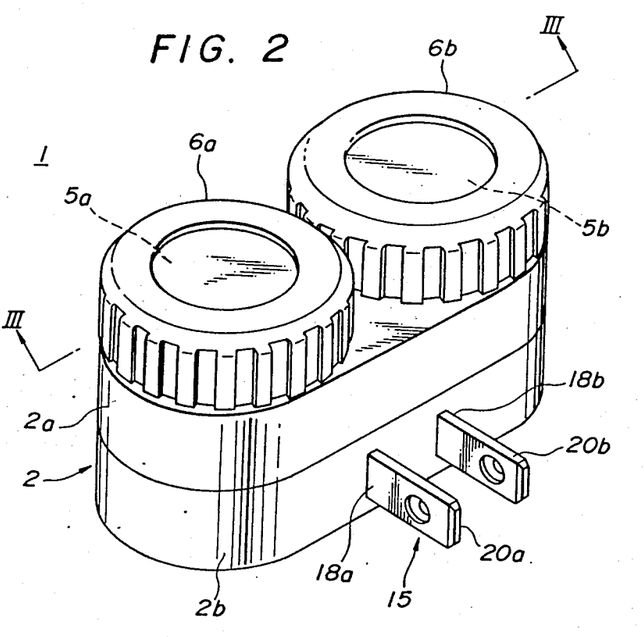
FIG. 2 is a perspective view of said preferred embodiment contact lens sterilization device in its assembled form, as seen from a plug terminal protrusion side thereof.

The present invention will now be described with reference to the preferred embodiments thereof. FIG. 1a shows the preferred embodiment of the contact lens sterilization device of the present invention in exploded perspective view, while FIG. 2 shows a perspective view of said contact lens sterilization device in its assembled state. In this figure, the reference numeral 1 denotes the contact lens sterilization device, and said device is used for boiling and sterilizing a pair of contact lenses not particularly shown in the figures.

The contact lens sterilization device 1 is formed as a completely sealed structure by the use of a single main body casing assembly 2, which is made in a generally elliptical shape as seen in plan view. (Such a view is not shown in any appended drawing, and actually the shape of the contact lens sterilization device 1 in such a plan view is generally that of two semicircles the horns of which are joined by two parallel lines). This main body casing 2 is made up from and comprises an upper casing portion 2a and a lower casing portion 2b, both shown in perspective view in FIG. 1a: the lower casing portion 2b has lip portions 2d1 and 2d2 extending generally around the greater part of its generally elliptical upper periphery, and these portions 2d1 and 2d2 are inserted inside the generally elliptical lower periphery 2e of the upper casing portion 2a, so as to locate said lower casing portion 2b with relation to said upper casing 2a. And said lower casing portion 2b and said upper casing portion 2a are then welded together along their generally elliptical upper and lower peripheries respectively, to form the unitary main casing assembly 2 which thereby has a sealed structure. Within said main casing assembly 2 are housed a heating system 3 and a circuit unit 4, both described in detail hereinafter, and said main casing assembly 2 serves for keeping said heating system 3 and said circuit unit 4 dry and protected from water and damp.

Figure 3:
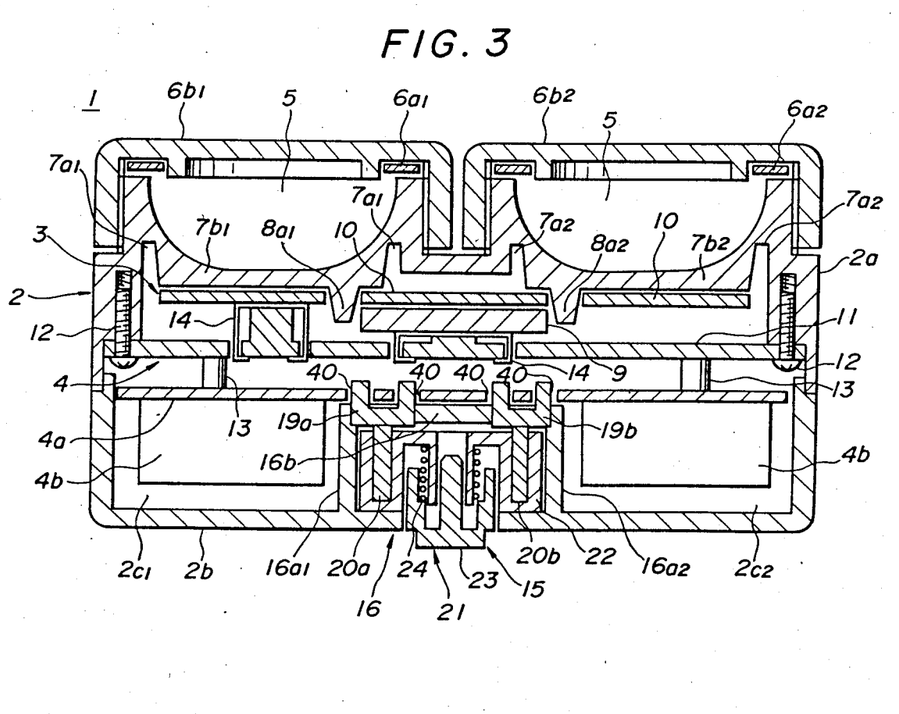
FIG. 3 is a sectional view of said preferred embodiment contact lens sterilization device, taken in a sectional plane containing its major axis and indicated by the arrows III—III in FIG. 2.

The upper side of the upper casing portion 2a is formed with a pair of substantially hemispherical depressions 5a and 5b, not clearly shown in FIG. 1 but visible in the sectional view shown in FIG. 3, and these depressions 5a and 5b define sterilization chambers for the contact lenses to be treated, not particularly shown. In use, said contact lenses are placed one in each of the hemispherical depressions 5a and 5b, each along with a quantity of water or other fluid for boiling and sterilization, and respective caps 6b1 and 6b2 are detachably screwingly fitted onto the tops of said depressions 5a and 5b with respective flexible washers 6a1 and 6b1 fitted under said caps 6b1 and 6b2, so as to seal the interiors of said depressions 5a and 5b to hold said boiling and sterilization water therein along with said contact lenses. Inside the casing assembly 2, the under side of the upper casing portion 2a, as shown in FIGS. 1a or 3 is formed with two protruding circular flat portions 7b1 and 7b2 which respectively correspond to the bottoms of the depressions 5a and 5b, and respective grooves 7a1 and 7a2 surround these flat portions 7b1 and 7b2. Further, on these circular flat portions 7b1 and 7b2 there are respectively formed columnar protrusions 8a1 and 8a2 protruding towards the inside of the casing assembly 2, and on the inner surface of the upper casing portion 2a between the depressions 5a and 5b formed thereon are provided two other columnar protrusions 8b1 and 8b2 also protruding towards the inside of the casing assembly 2 (of these, only the protrusion 8b1 can be properly seen in the drawings). And in this specified order between the upper casing portion 2a and the lower casing portion 2b there are clampingly fitted: a heating device 3, a central blocking plate 1, a circuit unit 4, and a floor plate 16b.

Figure 1B:
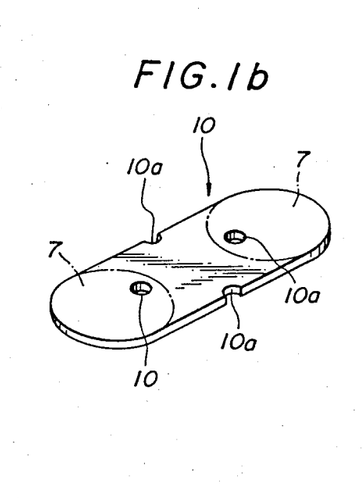

The heating device 3 comprises a disk shaped heat generating element 9 which is of a per se known type which generates heat when supplied with electrical power (such as a PTC semiconductor chip heating element) adhered to the central portion of the lower surface of a heat emission plate 10. This heat emission plate 10 is formed in a shape which is generally elliptical like the upper and lower casing portions 2a and 2b and is slightly smaller than them, and further is formed with four through apertures or notches 10a for passing the columnar protrusions 8a1, 8a2, and 8b2 therethrough. And said heat emission plate 10 is mounted within the hollow downward facing cavity of the upper casing portion 2a and is pressed upwards as seen in FIG. 1 thereagainst by the central blocking plate 11, and in this state said heat emission plate 10 only substantially contacts against the flat portions 7b1 and 7b2 of said upper casing portion 2a, being substantially separated from the remainder of said upper casing portion 2a by the grooves 7a1 and 7a2 surrounding said flat portions 7b1 and 7b2. Accordingly, as will be particularly described later, when the heat generating element 9 is supplied with electrical energy to produce heat which is transmitted therefrom to the heat emission plate 10, this heat is concentrated via said flat portions 7b1 and 7b2 to pass mostly to the sterilization chambers defined in the depressions 5a and 5b and to thereby heat the sterilization water and the contact lenses therein, to boil and sterilize said contact lenses as is desired, and said heat flow does not particularly pass to other portions of the upper casing portion 2a to be wasted, being instead largely intercepted by the grooves 7a1 and 7a2.

The central blocking plate 11 is formed also generally elliptical like the upper and lower casing portions 2a and 2b and is slightly smaller than them, and is fixedly secured to cover and close up the opening of the hollow downward facing cavity of the upper casing portion 2a by a plurality of relatively small screws 12 (see FIG. 3), so as to divide the heating device 3 from the circuit unit 4. This central blocking plate 11 is provided with two pins 13 which protrude downwardly therefrom in the figures towards the lower casing portion 2b, and further two contact pieces 14 are passed through said central blocking plate 11. One of these two contact pieces 14 is contacted at its upper portion in the figures to one of the terminals (not particularly shown) of the heat generating element 9, and the other of said contact pieces 14 is contacted at its upper portion in the figures to the heat emission plate 10 which is connected to the other of the terminals (not particularly shown either) of said heat generating element 9; while at their lower portions each of said two contact pieces 14 is contacted to an appropriate portion of the circuit unit 4, as will be explained shortly. Thereby, said contact pieces 14 serve for electrically connecting said heat generating element 9 to said circuit unit 4.

The circuit unit 4 is formed also generally elliptical like the upper and lower casing portions 2a and 2b and is slightly smaller than them, and comprises a printed circuit board or PCB 4a, on the upper side of which there as seen in the figures there is printed a printed circuit, not particularly shown in the figures. Various electronic component parts 4b are mounted to the lower surface of the printed circuit board 4a, which is further formed with four small holes 4c arranged in a linear fashion along one side of its longitudinal center portion. This printed circuit board 4a is fitted into the upwardly facing (in the figures) cavity of the lower casing portion 2b. Suitable portions of said printed circuit on the upper side of the printed circuit board 4a are contacted to the lower ends of the terminals 14, so as selectively to supply actuating electrical energy to the heat generating element 9, although this is not particularly shown in the figures. The circuit thus incorporated in this circuit unit 4 may be of a per se known type which will not be described herein with regard to its structure but only with regard to its function, and it should desirably have an auto power off feature so that it can automatically cease supplying actuating electrical energy to the heat generating element 9, after having supplied such electrical energy to said heat generating element 9 over a certain appropriate time interval.

In the central part of the interior of the lower casing portion 2b, there is defined a plug storage chamber 16 for a power plug 15: internal division plates 16a1 and 16a2 respectively separate said plug storage chamber 16 from side chambers 2c1 and 2c2, and these internal division plates 16a1 and 16a2 are integrally formed with the lower casing portion 2b. These side chambers 2c1 and 2c2 serve for receiving the various electronic component parts 4b which as described above are mounted to the lower surface of the printed circuit board 4a. The upper side in the figures of the plug storage chamber 16 is closed by the floor plate 16b previously mentioned, the periphery of which is welded to the internal division plates 16a1 and 16a2 and to the fore and aft sides of the lower casing portion 2b, so as to present a substantially impermeable barrier to passage therepast of water or moisture or the like, and so as substantially to isolate the plug storage chamber 16 from the interior of the case assembly 2. This floor plate 16b is generally rectangular in shape and is pierced with four small holes 40 arranged in a line so as to correspond to the four small holes 4c formed in the printed circuit board 4a. And each of two contact pieces 19 is formed into a U shape, with its two extremities being bent around through approximately 90° from its main body and being passed through two ones of the holes 40 in the floor plate 16b and two correspondng ones of the holes 4c in the printed circuit board 4a, when to make contact with appropriate portions of the printed circuit printed on said printed circuit board 4a. These contact pieces 19 may be fitted into these holes 40 either by insert molding or by press fitting; the important point is that the peripheries of the extremities of said contact pieces 19 tightly contact all around the peripheries of the holes 40 formed in the floor plate 16b through which they are passed, so that the sealed isolation of the plug storage chamber 16 from the interior of the case assembly 2 is substantially preserved.

In the lower surface of the lower case portion 2b and opening from the interior of the plug storage chamber 16 to the outside there is formed a knob actuation slot 17 extending generally perpendicular to the major axis of said lower case portion 2b, i.e. transverse to the contact lens sterilization device 1 as a whole, the central portion of said knob actuation slot 17 being formed with ridges 17a on both its sides which somewhat narrow down the width of said central portion of said knob actuation slot 17. And the side of said lower case portion 2b is formed with two substantially rectangular apertures 18a and 18b, which also open from the interior of said plug storage chamber 16 to the outside. These features are best understood from the perspective partial transverse sectional views shown in FIGS. 4 and 5. Inside said plug storage chamber 16 there is housed the aforementioned power plug 15, which is shown in perspective view on its own in FIG. 1a: this power plug 15 comprises a pair of plug terminals 20a and 20b which are fixed to and protrude from a main body member 22 comprised in a knob assembly 21. This main body member 22 is formed in a hollow box shape with a boss portion 22a extending from the middle of the inside surface of its bottom face. The knob assembly 21 further comprises a compression coil spring 24 fitted over the outside of said boss portion 22a of said main body member 22, and a knob member 23. This knob member 23 is also formed in a hollow box shape with a spindle portion 23a extending from the middle of the inside surface of its bottom face, and has an actuation portion 23b formed with serrations being provided on the outside surface of its said bottom face. The spindle portion 23a of the knob member 23 is slidably fitted into the boss portion 22a of the main body member 22 of the knob assembly 21, so that the compression coil spring 24 biases said knob member 23 and said main body member 22 apart from one another, as best seen in the sectional view of FIG. 3. And the plug terminals 20a and 20b are fixedly mounted to the main body member 22 of the knob assembly 21 so as to confront the rectangular apertures 18a and 18b in the side of the casing assembly 2, with the actuation portion 23b of the knob member 23 protruding through the knob actuation slot 17, and with the upper edges of said plug terminals 20a and 20b in FIG. 3 slidingly contacting the central portions of the contact pieces 19a and 19b respectively, so as to be assured of making good electrical connection with said contact pieces 19a and 19b at all times. In this state, the biasing action of the compression coil spring 24 keeps said upper edges in FIG. 3 of said terminals 20a and 20b squarely and orthogonally biased against said central portions of said contact pieces 19a and 19b respectively, by biasing the main body member 22 of the knob assembly 21 towards the floor plate 16b while keeping the lower surface of the knob member 23 biased against the inner surface of the lower casing member 2 around the actuation slot 17. Thus, by the hand of an operator pushing in the direction transverse to the contact lens sterilization device 1 against the serrations of the actuation portion 23b of the knob member 23 and sliding said knob member 23 to and fro along the slot 17, the plug terminals 20a and 20b either may be projected through the rectangular apertures 18a and 18b respectively to the outside of the contact lens sterilization device 1, or may be retracted to the inside of the plug storage chamber 16, as desired. And the provision of the ridges 17a on both the sides of the knob actuation slot 17 means that it is required for said operator to push the knob member 23 inwards somewhat, against the biasing action of the compression coil spring 24 which is overcome, in order to move said knob member 23 between its one extreme position at one end of said slot 17 which causes said plug terminals 20a and 20b to be fully projected through the rectangular apertures 18a and 18b, and its other extreme position at the other end of said slot 17 which causes said plug terminals 20a and 20b to be completely retracted into said plug storage chamber 16; and, when on the other hand said knob member 23 comes to be fully positioned to either of its said extreme positions along said slot 17, then said knob member 23 clicks outwards somewhat and is thereby locked in said extreme position against further simple sliding motion, and can only be slidingly moved again by being first again pushed inwards by the hand of the operator.

As shown in FIG. 6 which is a perspective view of this preferred embodiment 1 of the contact lens sterilization device of the present invention as seen from the opposite side thereof to that shown in FIG. 2, i.e. from its side opposite to its side out of which the terminals 20a and 20b are selectively poked as explained above, a temperature indicating display 25 is mounted on this other side of the upper casing portion 2a. This temperature indicating display 25 is of a type, such as for example a per se known liquid crystal type, which indicates the surface temperature of said upper casing portion 2a and, for example, displays an indication "65° C." when the temperature of said upper casing portion 2a exceeds 65° C. In other words, this indication may be made by a reversibly temperature sensitive material, protectingly covered with a transparent cover, and, for example, said reversibly temperature sensitive material may beof substantially the same yellow color as its background, when its temperature is less than 65° C., while it turns to black and thus makes the necessary indication of relatively high temperature, when its temperature rises to become greater than 65° C.

This preferred embodiment of the contact lens sterilization device of the present invention is produced and is assembled as follows.

First, with regard to the main body casing 2, its component parts the upper casing portion 2a and the lower casing portion 2b are separately manufactured by injection molding from synthetic resin or the like, and similarly the caps 6b1 and 6b2 and the floor plate 16b for the plug storage chamber 16 are formed. Then the heat emission plate 10 with the heat generating element 9 attached thereto is fitted into the downwardly facing opening in FIGS. 1a and 3 of the upper casing portion 2a, and the central blocking plate 11 is laid against said heat emission plate 10 and is fixed to the upper casing portion 2a by the screwing action of the small screws 12.

Meanwhile, the compression coil spring 24 is fitted over the boss portion 22a of the main body member 22 of the knob assembly 21 for the male power plug 15, after of course the male plug terminals 20a and 20b have been fixedly fitted to said main body member 22 as for example by being integrally insert molded thereinto, and next the spindle portion 23a of the knob member 23 is slidably fitted into said boss portion 22a of said main body member 22 of said knob assembly 21 from its upper side as seen in FIG. 1a, and said knob member 23 is then pushed towards said main body member 22, so that the compression coil spring 24 now is compressed so as to bias said knob member 23 and said main body member 22 apart from one another. Then, this entire male power plug 15 is fitted into the plug storage chamber 16, with the actuation portion 23b of the knob member 23 which is formed with serrations on the outside surface of its bottom face being protruded through the knob actuation slot 17 and at the end thereof remote from the rectangular apertures 18a and 18b in the side of the lower casing portion 2b, and with the plug terminals 20a and 20b confronting but not of course now passed through said rectangular apertures 18a and 18b. And next the floor plate 16b, after the contact pieces 19 have been fitted through the holes 40 therein either by integral insert molding or by press fitting so that the peripheries of the extremities of said contact pieces 19 tightly sealingly contact all around the peripheries of said holes 40 through which they are passed, is welded over the plug storage chamber 16, i.e. with the periphery of said floor plate 16b being welded to the internal division plates 16a1 and 16a2 and to the fore and aft sides of the lower casing portion 2b, so as to present a substantially impermeable barrier to passage therepast of water or moisture or the like, and so as substantially to isolate said plug storage chamber 16 from the interior of the case assembly 2. And in this situation the plug terminals 20a and 20b slidingly contact the central portions of the contact pieces 19a and 19b respectively, so as to be assured of making good electrical connection with said contact pieces 19a and 19b at all times; still, said interior of the case assembly 2 is effectively isolated from said plug storage chamber 16.

Next, the printed circuit board 4a with the electronic components 4b mounted to the printed circuit thereon is laid on the lower casing portion 2b, and the lip portions 2d1 and 2d2 of the lower casing portion 2b are inserted inside the generally elliptical lower periphery 2e of the upper casing portion 2a. Next, said lower casing portion 2b and said upper casing portion 2a are then welded together along their generally elliptical upper and lower peripheries respectively, to form the unitary main casing assembly 2 which thereby has an effectively sealed structure, by the cooperation of the upper and lower casing portions 2a and 2b and the floor plate 16b which are all welded together, the only slight openings through said sealed structure being the small holes 40 which are specified above are tightly sealingly engaged to and all around the peripheries of the extremities of the contact pieces 19 which pass through them. And the circuit unit 4 and the heating unit 3 are tightly received within said sealed structure of said main casing assembly 2.

This preferred embodiment of the contact lens sterilization device of the present invention operates as follows.

First, one contact lens is stored in each of the hemispherical depressions 5a and 5b, each along with a quantity of water or other fluid for boiling and sterilization, and the respective caps 6b1 and 6b2 are detachably screwingly fitted onto the tops of said depressions 5a and 5b with respective flexible washers 6a1 and 6b1 fitted under said caps 6b1 and 6b2, so as to seal the interiors of said depressions 5a and 5b to hold said boiling and sterilization water therein along with said contact lenses.

And next the user pushes with his or her finger in the direction along the slot 17 against the serrations of the actuation portion 23b of the knob member 23 and slides said knob member 23 along the slot 17, so as to project the plug terminals 20a and 20b through the rectangular apertures 18a and 18b respectively to the outside of the contact lens sterilization device 1, however first pushing said knob member 23 inwards somewhat, against the biasing action of the compression coil spring 24 which is overcome, in order to get said knob member 23 past the ridges 17a on the sides of the knob actuation slot 17. Thus, when said knob member 23 comes to be fully positioned to its extreme position at the end of said slot 17 towards the rectangular apertures 18a and 18b, with the plug terminals 20a and 20b properly protruding through the apertures 18a and 18b, then said knob member 23 clicks outwards somewhat and is thereby locked in said extreme position against further simple sliding motion, and can only be slidingly moved again by being first again pushed inwards by the hand of the operator.

Next, the operator plugs the contact lens sterilization device 1 as a whole against a female AC power outlet, with the protruding plug terminals 20a and 20b sticking into and making contact with appropriate female terminals in said power outlet. And thereby AC power is supplied to the printed circuit on the printed circuit board 4a, via said terminals 20a and 20b and the contact pieces 19a and 19b respectively slidingly contacted thereto. This causes said printed circuit to function as follows: initially said printed circuit supplies electrical energy, via the two contact pieces 14 passed through the central blocking plate 11, to the terminals of the heat generating element 9 mounted on the heat emission plate 10, and thereby causes said heat generating element 9 to become hot. This heat is conducted from said heat generating element 9 almost entirely to the circular flat portions 7b1 and 7b2 which respectively correspond to the bottoms of the depressions 5a and 5b in which the contact lenses and sterilizing fluid are currently being received, and by the interposition of the respective grooves 7a1 and 7a2 around these flat portions 7b1 and 7b2 any substantial flow of heat to other portions of the contact lens sterilization device, in particular to the outer surface portions of the casing assembly 2, is very effectively prevented. Thereby, the sterilization fluid in said depressions 5a and 5b is heated and boiled, and the contact lenses therein are effectively sterilized. After the elapsing of a certain appropriate and sufficient time interval, the circuit unit 4 ceases to supply electrical energy to the terminals of the heat generating element 9, and thereby the heating and boiling action for the depressions 5a and 5b and the contact lenses therein is terminated.

During this sterilization process, since inevitably a certain amount of heat does flow to the outer surface portions of the casing assembly 2, it may occur that the temperature of said outer surface portions should rise to more than is comfortable or safe for the user to handle, exemplarily in this case to greater than 65° C. In such an event, the temperature indicating display 25 will, as explained above, display an indication "65° C." or the like, in order to warn the user not carelessly to touch said outer surface portions of the casing assembly 2, since the temperature of at least a part thereof has risen to become greater than 65° C. On the other hand, when the circuit unit 4 has ceased to supply electrical energy to the terminals of the heat generating element 9, and thereby the heating and boiling action for the depressions 5a and 5b and the contact lenses therein has been terminated and subsequently the outer surface portions of the casing assembly 2 have somewhat cooled down, by its action being reversed the temperature indicating display 25 will now cease to display the indication "65° C." or the like, so as to indicate to the user that it will now be comfortable and safe for the user to handle said surface portions of said casing assembly 2. This cessation of display of the indication "65° C." or the like also serves for telling the user that the sterilization process for his or her contact lenses is complete, so that he or she may now withdraw the power plug 15 from the female power socket into which it is inserted, and may remove the contact lenses from the sterilization fluid in the depressions 5a and 5b for subsequent use.

Thus, according to the present invention, because the main cavity in the body casing is substantially sealed, since the contact pieces 19a and 19b are sealed to the floor plate 16b where they pass through it, the ingress of water or moisture or other contaminants such as dirt to sully and interfere with the control system and the heating system is effectively prevented. When it is desired to supply electrical power to the contact lens sterilization device 1, simply the terminal portions 20a and 20b of the power plug assembly 15 are projected out of the power plug storage chamber 16 by movement of said power plug assembly 15 in said storage chamber 16 as described above, and are plugged into a female AC power electrical socket. Then, via said terminal portions 20a and 20b, AC power is conveyed to said fixed contact pieces 19a and 19b, which lead said AC power to the control system to actuate it. Then said control system selectively supplies power to said heating unit, so as to cause it to generate heat and to supply said heat to the portions of the main body which partly define the contact lens sterilization chambers 5a and 5b. Thereby, said contact lens sterilization chambers 5a and 5b are heated up, and contact lenses and sterilization fluid such as water or the like stored therein are heated up and are boiled and sterilized. According to the present invention as defined above, therefore, there is provided a contact lens sterilization device which does not have any extended lead wire with a male AC power plug appended at the end thereof, and which is guaranteed of good sealing characteristic, being proof against the inward oozing of dirt or water or moisture. Further, even when the male plug terminals 20a and 20b are abused as by repeated insertion into or wiggling within female AC plugs, there is no risk of any problem of opening up of gaps which can cause leaks, because the plug terminals 20a and 20b are not directly mounted to the main casing assembly 2 but rather to the movable power plug assembly 15. Further, this contact lens sterilization device 1 does not require any provision of any protective sheath for its male plug terminals 20a and 20b, because said main plug terminals 20a and 20b can be retracted to within the power plug storage chamber 16 when the user so desires. Accordingly the problem of possible loss or mislaying of any such protective sheath is avoided. This contact lens sterilization device 1 thus is compact and not at all hazardous, as well as being durable and cheap, particularly because its main body casing assembly 2 is formed as a unitary member.

Further, according to the shown preferred embodiment of the present invention, because the fixed contact pieces 19a and 19b are not required to be spring contact pieces, good sealing between said fixed contact pieces 19a and 19b and the plate 16b through which they are passed is made possible, and furthermore compactness is enhanced, thus increasing good portability. Also, cost is reduced and the contact lens sterilization device 1 is made easier to assemble.

Further, since the power plug storage chamber 16 is separated from the main cavity in the casing assembly 2 by the panel 16b which is an insulator, and since the internal ends of the fixed contacts 19a and 19b are directly connected to portions of the printed circuit board 4a, as opposed to conventional devices utilizing spring contact pieces the circuit unit and the plug storage chamber can be completely separated. And, since the fixed contact pieces can be directly connected to the printed circuit board in the same was as spring contact piecese, the main body casing can be built as a completely sealed structure.

Yet further, the heat from the heat emission plate 10 is preferentially conducted to the portions of the main body casing assembly 2 against which said heat emission plate 10 is pressed, which partly define the contact lens sterilization chambers 5a and 5b, i.e. to the flattened portions 7b1 and 7b2, and thereby the heating up of the outer surface of the main body casing assembly 2 is militated against, and the efficiency of the heating process is much increased. In other words, there is a much reduced chance of said outer surface of said main body casing assembly 2 getting so hot as to run a risk of burning or scorching the user; and furthermore energy conservation is desirably promoted.

And, because of the provision of the display device 25, it is clearly displayed that the surface temperature has dropped after the completion of the sterilization process. Accordingly, with the use of this contact lens sterilization device 1 according to the preferred embodiment of the present invention, no substantial risk is engendered of the user being burnt, scorched or scalded by touching surface parts of its casing, and the safety factor is greatly enhanced. And the dropping of the temperature indication of the display device 25 may serve as a signal for disconnecting this contact lens sterilization device 1 from its power source, i.e. the AC main, which is quite convenient.

In this shown preferred embodiment of the contact lens sterilization device of the present invention, the contact pieces 19, fitted through the holes 40 in the floor plate 16b and closely contacted thereto as by integral insert molding or by press fitting or the like, were formed as U shaped members, each of them with its two extremities being bent around through approximately 90° from its main body so as to pass through said holes 40. However, this should not be considered as limitative of the present invention, because in other possible embodiments of the present invention these contact pieces 19 could be formed in other shapes; for example, they could be formed as T shaped members. In such a case, the vertical bars of their T shapes would be passed through the holes 40, which would be two in number, and similarly the holes 4c in the printed circuit board 4a would also be two in number.

Further, although in this shown preferred embodiment of the contact lens sterilization device of the present invention the floor plate 16b was formed separately from the lower casing portion 2b and was subsequently intimately attached thereto by welding or the like, nevertheless this should not be considered as limitative of the present invention, because in other possible embodiments said floor plate could be formed separately from the lower casing portion, and the plug storage chamber 16b could be opened up by, instead, the side of it opposite the plug terminal protrusion holes 18a and 18b being opened up, in order to fit the power plug 15 thereinto. Also, in other possible embodiments of the present invention, it would be possible to electrically connect the terminal male members 20a and 20b to the members 19 by lead wires or the like, rather than simply by sliding contact. Other possible modifications could be conceived of: for example, the compression coil spring 24 could be replaced by a leaf spring bent through an obtuse angle, or the like.

Yet further, although in this shown preferred embodiment of the contact lens sterilization device of the present invention the temperature indicatng display 25 was constructed so as to dispay an indication "65° C." when the temperature of the outer surface portions of the casing assembly 2 rose to more than is comfortable or safe for the user to handle, exemplarily in this case to greater than 65° C., in other possible embodiments it would be possible for said temperature indicating display to display various other possible indications, such as the legends "high temperature" or "hot", or cartoon characters or Japanese kanjis, or even to display readings for two or more temperature levels, such as for example "rather hot" and "very hot" or the like.

Although the present invention has been shown and described in terms of certain preferred embodiments thereof, and with reference to the appended drawings, it should not be considered as being particularly limited thereby. The details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the legitimate and properly interpreted scope of the accompanying claims, which follow.

What is claimed is:

1. A contact lens sterilization device, comprising:
   a main body casing formed as an integral structure, with a main cavity and a power plug storage chamber being defined in said main body casing and being substantially sealed off from communication with one another, said main cavity further being substantially sealed off from communication with the outside, a contact lens sterilization chamber being at least partly defined by a portion of said main body casing which also defines one part of said main cavity;
   a control system accomodated in said main cavity of said main body casing;
   a heating system, likewise accomodated in said main cavity of said main body casing, and selectively actuated by said control system to produce heat and to apply said heat to said portion of said main body which partly defines said contact lens sterilization chamber;
   a power plug assembly, received in said power plug storage chamber, and comprising a pair of terminal portions which according to movement of said power plug assembly within said power plug storage chamber selectively either can be projected to the outside from said power plug storage chamber or can be withdrawn to the inside of said power plug storage chamber;
   and:
   a pair of fixed contacts fitted so as to electrically connect portions of said control system to said terminal portions of said power plug assembly.

2. A contact lens sterilization device according to claim 1, wherein said pair of fixed contacts pass through a portion of said main body casing which separates said main cavity from said power plug storage chamber.

3. A contact lens sterilization device according to claim 2, wherein said pair of fixed contacts are sealingly fitted through said portion of said main body casing which separates said main cavity from said power plug storage chamber.

4. A contact lens sterilization device according to claim 3, wherein said pair of fixed contacts are insert molded through said portion of said main body casing which separates said main cavity from said power plug storage chamber.

5. A contact lens sterilization device according to claim 3, wherein said pair of fixed contacts are press fitted through said portion of said main body casing which separates said main cavity from said power plug storage chamber.

6. A contact lens sterilization device, comprising:
   a main body casing formed as an integral structure, with a main cavity and a power plug storage chamber being defined in said main body casing and being substantially sealed off from communication with one another, said main cavity further being substantially sealed off from communication with the outside, a contact lens sterilization chamber being at least partly defined by a portion of said main body casing which also defines one part of said main cavity;
   a control system accomodated in said main cavity of said main body casing;
   a heating system, likewise accomodated in said main cavity of said main body casing, and selectively actuated by said control system to produce heat and to apply said heat to said portion of said main body which partly defines said contact lens sterilization chamber;
   a pair of fixed contacts fitted from said main cavity of said main body casing to said plug storage chamber and electrically connected in said main cavity to portions of said control system;
   and:
   a power plug assembly, received in said power plug storage chamber, comprising:
   a main plug body member;
   a pair of terminal portions, mounted to said main plug body member, which according to movement of said power plug assembly within said power plug storage chamber selectively either can be projected to the outside from said power plug storage chamber or can be withdrawn to the inside of said power plug storage chamber;
   a knob, an actuation portion of which protrudes to the outside of said power plug storage chamber;
   and:
   a spring which biases said knob and said main plug body member apart from one another so as to bias said actuation portion of said knob towards the outside and so as to bias said terminal portions each to contact one of said pair of fixed contacts.

7. A contact lens sterilization device according to claim 6, wherein said actuation portion of said knob protrudes to the outside of said power plug storage chamber through a slot.

8. A contact lens sterilization device, comprising:
   a main body casing formed as an integral structure, with a main cavity and a power plug storage chamber being defined in said main body casing and being substantially sealed off from communication with one another by an insulating wall member, said main cavity further being substantially sealed off from communication with the outside, a contact lens sterilization chamber being at least partly defined by a portion of said main body casing which also defines one part of said main cavity;

a control system, comprising at least one electronic component and a printed circuit board, accomodated in said main cavity of said main body casing;

a heating system, likewise accomodated in said main cavity of said main body casing, and selectively actuated by said control system to produce heat and to apply said heat to said portion of said main body which partly defines said contact lens sterilization chamber; a pair of fixed contacts fitted from said main cavity of said main body casing through said insulating wall member to said plug storage chamber and electrically connected in said main cavity to portions of said printed circuit board; and:

a power plug assembly, received in said power plug storage chamber, comprising:

a main plug body member;

a pair of terminal portions, mounted to said main plug body member, which according to movement of said power plug assembly within said power plug storage chamber selectively either can be projected to the outside from said power plug storage chamber or can be withdrawn to the inside of said power plug storage chamber;

a knob, an actuation portion of which protrudes to the outside of said power plug storage chamber; and:

a spring which biases said knob and said main plug body member apart from one another so as to bias said actuation portion of said knob towards the outside and so as to bias said terminal portions each to contact one of said pair of fixed contacts.

9. A contact lens sterilization device according to claim 8, wherein said terminal portions of said power plug assembly slide against said fixed contacts which they contact in a substantially orthogonal fashion.

* * * * *